(12) United States Patent
Mintchev (10) Patent No.: US 7,882,070 B2
(45) Date of Patent: Feb. 1, 2011

(54) SYSTEM AND METHOD FOR UDDI DATA MIGRATION USING STANDARD UDDI V3 API

(75) Inventor: Alexander D. Mintchev, Sofia (BG)

(73) Assignee: SAP AG, Walldorf (DE)

( * ) Notice: Subject to any disclaimer, the term of this patent is extended or adjusted under 35 U.S.C. 154(b) by 434 days.

(21) Appl. No.: 11/967,572

(22) Filed: Dec. 31, 2007

(65) Prior Publication Data

US 2009/0172038 A1 Jul. 2, 2009

(51) Int. Cl.
*G06F 7/00* (2006.01)
(52) U.S. Cl. ...................................... 707/641
(58) Field of Classification Search .................. 707/641
See application file for complete search history.

(56) References Cited

U.S. PATENT DOCUMENTS

2004/0139082 A1* 7/2004 Knauerhase et al. ........ 707/100
2007/0033167 A1* 2/2007 Basu et al. ..................... 707/3
2009/0063408 A1* 3/2009 Bao et al. ..................... 707/3
* cited by examiner

*Primary Examiner*—Pierre M Vital
*Assistant Examiner*—Truong V Vo
(74) *Attorney, Agent, or Firm*—Blakely Sokoloff Taylor & Zafman LLP (57) ABSTRACT

A system and method are described for Universal Description Discovery and Integration (UDDI) data migration exporting existing UDDI V3 data from a UDDI V3 compliant repository (a source repository) and importing this data into another UDDI V3 compliant repository (a destination repository). The data from the source repository is migrated into the destination repository and remains in the custody of the destination repository. The method preserves the user name and entity key associated with the data during the process. If that is not possible, the method generates new user names and/or entity keys and creates a mapping between the original and the generated user names and/or keys in order to dispatch the requests properly during runtime. Source repository is required to support the mandatory UDDI v3 APIs and may need to support the optional Security API Set. Destination repository is required to support the mandatory UDDI v3 API and the optional Security API Set. Other optional APIs (as replication and subscription for example) are not required to be supported by any of the repositories.

2 Claims, 8 Drawing Sheets

```
<?xml version="1.0" encoding="UTF-8" ?>
<Envelope xmlns="http://schemas.xmlsoap.org/soap/envelope/">
 <Body>
  <find_tModel xmlns="urn:uddi-org:api_v3" maxRows="5" listHead="1">
   <findQualifiers>
    <findQualifier>approximateMatch</findQualifier>
    <findQualifier>uddi:uddi.org:findqualifier:sortbydateasc</findQualifier>
   </findQualifiers>
   <name>%</name>
  </find_tModel>
 </Body>
</Envelope>
```

FIG.9

SYSTEM AND METHOD FOR UDDI DATA MIGRATION USING STANDARD UDDI V3 API

FIELD OF INVENTION

This disclosure relates generally to software, and in particular but not exclusively relates to Universal Description Discovery and Integration (UDDI) data migration techniques.

BACKGROUND

Universal Description, Discovery and Integration (UDDI) is a platform-independent, XML-based registry for businesses worldwide to list themselves on the Internet. UDDI is an open industry initiative, enabling businesses to publish service listings and discover each other and define how the services or software applications interact over the Internet.

Although each commercial UDDI implementation claims to support the UDDI standard, the interoperability between any two UDDI compliant products of different vendors is minimal. Once having bought a UDDI product of a particular vendor and having published their data into it, customers cannot migrate their existing UDDI solution to that of a new vendor as a universal tool to transfer the UDDI user data between any two UDDI products does not exist. There are optional APIs of the UDDI standard (as replication and subscription APIs for example) which might be used for that purpose, but there is no guarantee that all UDDI products support them.

Thus, what is required is a software tool that transfers user data from any source UDDI V3 compliant repository into any destination UDDI V3 compliant repository. Within this tool, the UDDI entity keys and ownership of UDDI data from the source repository need to be preserved into the destination repository, whenever this is possible.

SUMMARY

A system and method are described for Universal Description Discovery and Integration (UDDI) data migration exporting existing UDDI V3 data from a UDDI V3 compliant repository (a source repository) and importing this data into another UDDI V3 compliant repository (a destination repository). The data from the source repository is migrated into the destination repository and remains in the custody of the destination repository. The method preserves the user name and entity key associated with the data during the process. If that is not possible, the method generates new user names and/or entity keys and creates a mapping between the original and the generated user names and/or keys in order to dispatch the requests properly during runtime. Source repository is required to support the mandatory UDDI v3 APIs and may need to support the optional Security API Set. Destination repository is required to support the mandatory UDDI v3 API and the optional Security API Set. Other optional APIs (as replication and subscription for example) are not required to be supported by any of the repositories.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for Universal Description Discovery and Integration (UDDI) data migration are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
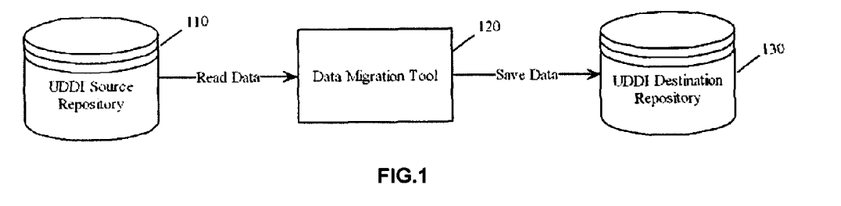
FIG. 1 is a block diagram of a system for UDDI data migration, in accordance with an embodiment of the present invention.

FIG. 1 is a block diagram of a system for UDDI data migration. The Data Migration Tool 120 reads UDDI data items from the UDDI Source Repository 110 and saves the UDDI data items in the UDDI Destination Repository 130. Communication between the Data Migration Tool 120, the UDDI Source Repository 110, and the UDDI Destination Repository 130 is comprised of pure UDDI v3 SOAP requests. This allows the Data Migration Tool 120 to be independent of the implementation of both source and destination repositories. The system may thus rely only on the adherence on both repositories to UDDI v3 standard. The migrated UDDI data items remain in the custody of the UDDI Destination Repository 130, rendering obsolete any further usage of the UDDI Source Repository 110. The Data Migration Tool 120 attempts to preserve the user names and the UDDI entity keys associated with the UDDI data items during the process.

If it is not possible to migrate a UDDI data item preserving its original UDDI entity key, the Data Migration Tool 120 creates a corresponding unique UDDI entity key in the UDDI Destination Repository 130 and saves the UDDI data item using the new key. Further, the Data Migration Tool 120 maps the original UDDI entity key from the UDDI Source Repository 110 to its new value in the UDDI Destination Repository 130. This mapping allows the Data Migration Tool 120 to serve as a bridge between the UDDI client and the UDDI Destination Repository 130 when a UDDI client requests a UDDI data item by its original key.

If it is not possible to migrate a UDDI data item preserving the original user name for which the data was stored into the UDDI Source Repository 110, the Data Migration Tool 120 creates a new unique user name in the UDDI Destination Repository 130 and saves the UDDI data item on behalf of the new user name. Further, the Data Migration Tool 120 maps the original user name from the UDDI Source Repository 110 to its new value in the UDDI Destination Repository 130. This mapping allows the Data Migration Tool 120 to serve as a bridge between the UDDI client and the UDDI Destination Repository 130 when a UDDI client requests a UDDI data item by its original user name.

Figure 2:
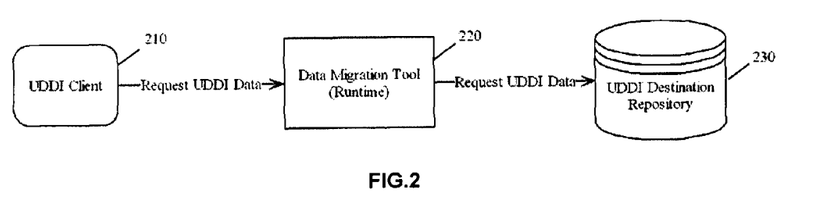
FIG. 2 is a block diagram of a system to acquire and provide to a UDDI client already migrated UDDI data, in accordance with an embodiment of the present invention.

FIG. 2 is a block diagram of a system to acquire and provide to a UDDI client 210 already migrated UDDI data. The UDDI client 210 works transparently with the destination repository, as if it were working with the source repository, with little or no changes in the client code (inasmuch this is possible). During runtime the Data Migration Tool 220 serves as a bridge between a UDDI client 210 and the UDDI Destination Repository 230. The mapping done by the Data Migration Tool 210 during the data migration process allows the Data Migration Tool 210 to translate all incoming requests for UDDI data items containing any user names and/or UDDI entity keys that had to be changed during the migration.

In one embodiment of the invention the Data Migration Tool 210 works as an individual web-application, exposed as a web-service, communicating through SOAP requests via HTTP/HTTPS. The Data Migration Tool 210 provides the following custom-defined methods as web-service operations, which a UDDI client may use to work with migrated UDDI data items:

String [] getAllMappedUsers( )—used to obtain a list of all user names from the UDDI Source Repository, who have different user names in the UDDI Destination Repository 230. If the result is empty, all users form the UDDI Source Repository have preserved their user names in the UDDI Destination Repository 230.

String getMappedUser (String source_username)—used to obtain the user name in the UDDI Destination Repository 230 of a user from the UDDI Source Repository. An exception is thrown if there is no existing user name from the UDDI Destination Repository 230 that corresponds to the user name from the UDDI Source Repository. This could either mean that the source user name is preserved in the UDDI Destination Repository 230 or that such user name does not exist in both repositories.

String getSourceRepositoryUser (String dest_username)—used to obtain the user name in the UDDI Source Repository of a user from the UDDI Destination Repository 230. An exception is thrown if there is no existing user name from the UDDI Source Repository that corresponds to the user name from the UDDI Destination Repository 230. This could either mean that the destination user name is preserved in the UDDI Source Repository or that such user name does not exist in both repositories.

URI [] getAllMappedKeys( )—used to obtain a list of all UDDI entity keys from the UDDI Source Repository which are saved with different values in the UDDI Destination Repository 230. If the result is empty, all UDDI entity keys from the UDDI Source Repository have preserved their values in the UDDI Destination Repository 230 during the migration.

URI getMappedKey(URI source_rep_key)—used to obtain the UDDI entity key in the UDDI Destination Repository 230 of a UDDI data item by specifying its original UDDI entity key from the UDDI Source Repository. An exception is thrown if there is no existing UDDI entity key in the UDDI Destination Repository 230 that corresponds to the provided UDDI entity key from the UDDI Source Repository. This could either mean that the original UDDI entity key is preserved in the UDDI Destination Repository 230 or that the provided key does not exist in both repositories.

URI getSourceRepositoryKey (URI destination_key)—used to obtain the original UDDI entity key in the UDDI Source Repository of a UDDI data item by specifying its UDDI entity key from the UDDI Destination Repository 230. An exception is thrown if there is no existing UDDI entity key in the UDDI Source Repository that corresponds to the provided UDDI entity key from the UDDI Destination Repository 230. This could either mean that the original UDDI entity key has been migrated with the same value in the UDDI Destination Repository 230 or that the provided key does not exist in both repositories.

Communication between the Data Migration Tool 220 and the UDDI Destination Repository 230 consist of UDDI v3 SOAP requests. The UDDI Destination Repository 230 may be used independently from the Data Migration Tool 220 as it is completely unaware of its existence. However, the Data Migration Tool 220 needs to know the endpoint URLs of the UDDI Destination Repository 230 and how its APIs can be invoked. The Data Migration Tool 220 needs to expose all UDDI v3 APIs that the UDDI Destination Repository 230 supports.

Figure 3:
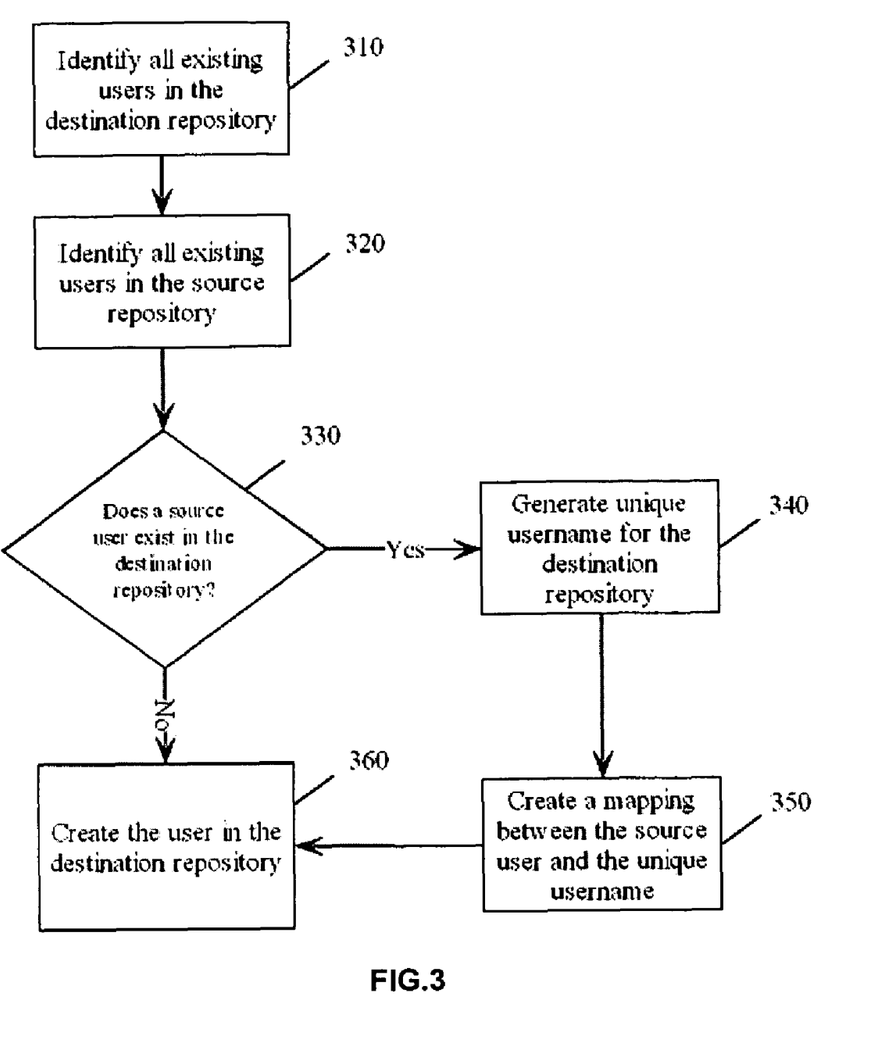
FIG. 3 is a flow diagram for creating a unique user name in the destination repository prior to the UDDI data migration, in accordance with an embodiment of the present invention.

FIG. 3 is a flow diagram for creating a unique user name in the destination repository prior to the UDDI data migration. This new user name will be the future owner of the migrated data.

In one embodiment of the invention, each extracted UDDI data item could be saved into the destination repository preserving the user name associated with the data item in the source repository. If the user name already exists in the destination repository and stands for a different user than the owner of the data item in the source repository, a new user is created in the destination repository. Blocks 310 to 360 describe the process creating a new unique user on behalf of whom the data item will be saved. All existing users from the destination repository are identified at block 310. All existing users from the source repository are identified at block 320. A check if a source user exists in the destination repository is performed at block 330. If it exists and it does not designate the same user as the owner of the data item in the source repository, at block 340, a unique username for the destination repository is generated. This is made possible because all the existing users have been previously identified at block

310. At block 350, a mapping between the owner of the data item in the source repository 110 and the new user who is going to be the future owner of the data item in the destination repository 130 is created. The new user is created in the destination repository 130 at block 360. If at block 330 the user does not exist, the user is created in the Destination Repository at block 360.

In another embodiment of the invention, all UDDI data items contained in the UDDI Source Repository could be saved into the UDDI Destination Repository on behalf of a single user, such as the Administrator of the UDDI Destination Repository. This is a possible option if the UDDI data items would be used mainly for inquiry purposes or if the UDDI data items ownership in the UDDI Destination Repository is irrelevant.

Figure 4:
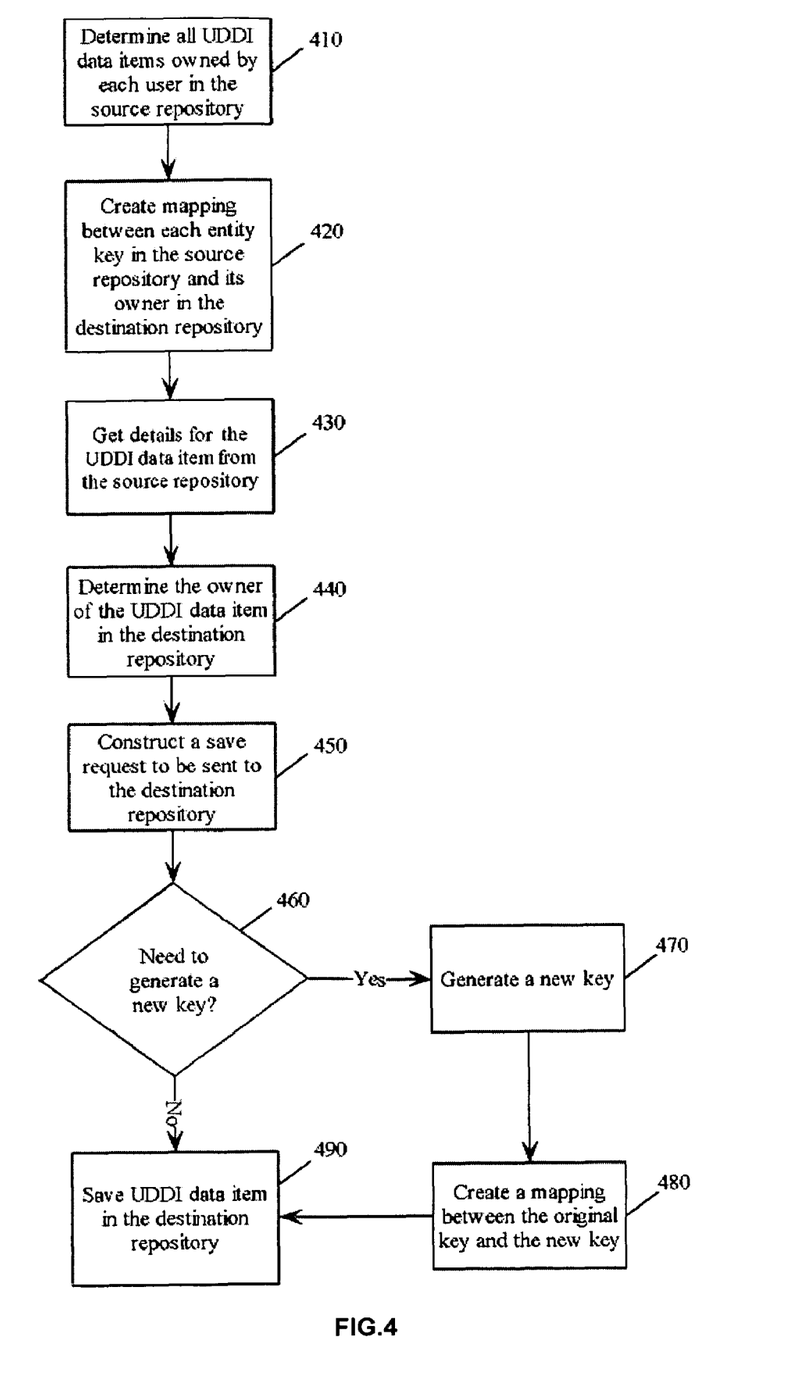
FIG. 4 is a flow diagram for migrating a single UDDI data item, in accordance with an embodiment of the present invention.

FIG. 4 is a flow diagram for migrating a single UDDI data item. At block 410, information about all UDDI data items, owned by each user existing in the source repository 110, is extracted from the source repository 110. In one embodiment of the invention, this may be achieved by sending the UDDI Publish API request get_registeredInfo to the source repository for each user from the source repository. At block 420 a mapping between each entity key in the source repository and its owner in the destination repository is created. In another embodiment of the invention, the owner might be determined by first sending a UDDI Inquiry API get_operationInfo request to the source repository and then finding the owner by performing a search in a previously compiled mapping between the authorized names and the user names of all data owners from the source repository. At block 430, a request for details about the UDDI data item is sent to the source repository 110. The details are later used to create the new UDDI data item to be stored in the destination repository 130. In an embodiment of the invention, a request to obtain all details about a UDDI item could be the UDDI Inquiry API get_tModelDetails request. At block 440, the owner of the new UDDI data item in the destination repository 130 is determined. This is achieved by using the mapping created at block 420, as well as the user name mapping as described above in reference to block 350 in FIG. 3. Referring again to FIG. 4, if there is no existing entry in the mapping for the owner of the UDDI data item, the original owner is preserved. At block 450, a save request is issued and the new UDDI data item is constructed using the details obtained at block 430 and the owner obtained at block 440. At block 460, a check is made to determine if a new UDDI entity key for the UDDI data item needs to be generated in the destination repository 130. If a new key needs to be generated, at block 470 a new key is generated. At block 480, a mapping between the original key from the source repository and the new key from the destination repository is created. This is done so that it will be possible to adapt any further client requests for the UDDI data item after it gets migrated. The UDDI data is saved at block 490. If at block 460 it is determined that a new key does not need to be generated, the UDDI data key is saved at block 490.

Figure 5:
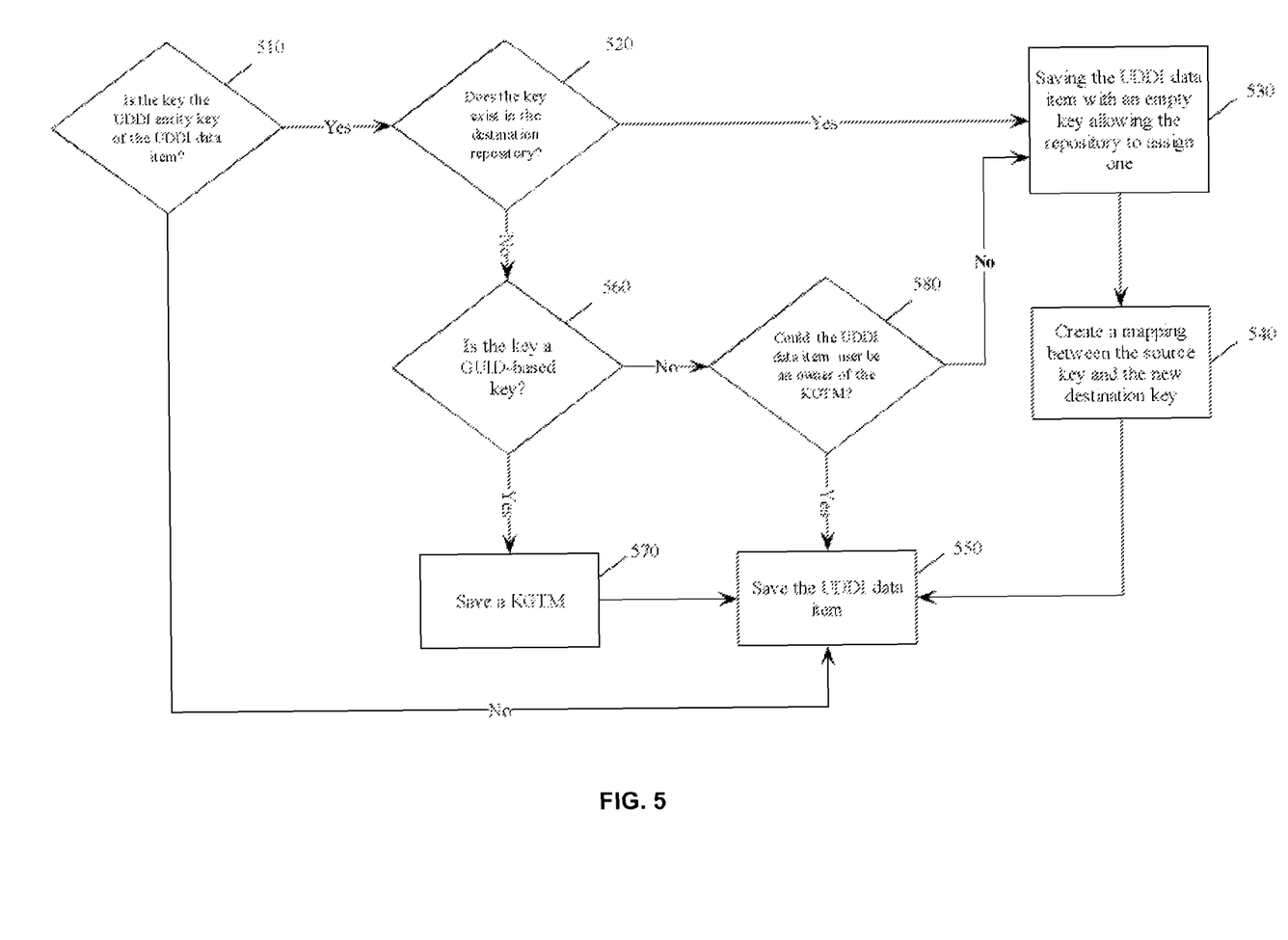
FIG. 5 is a flow diagram for generating an entity key to be associated with the UDDI data item in the destination repository, in accordance with an embodiment of the present invention.

FIG. 5 is a flow diagram for generating an entity key to be associated with the UDDI data item in the destination repository 130 as described above in reference to blocks 460-490 of FIG. 4. Referring to FIG. 5, at block 510, a check is performed to determine if the entity key is the UDDI entity key of the UDDI data item. (If the item to be saved is a tModel—the check is whether the key is the tModelKey; If the item to be saved is a business entity, the check is whether the key is a business entity key, etc.). If not, the key should be present in the destination repository 130. Therefore, the key is inserted without any modifications in the body of the save request at block 550. Otherwise, another check is performed at block 520 to determine if the UDDI entity Key exists in the destination repository 130. If the key exists, the data migration tool 120 inserts an empty key in the body of the save request and the destination repository 130 determines a new unique key for the UDDI item. At block 540, a mapping is created between the original key in the source repository 110 and the new key in the destination repository 130 enabling a UDDI client 210 to request the migrated data through the data migration tool 220 by its original key. The UDDI data is saved at block 550.

If at block 520, the UDDI entity Key does not exist in the destination repository 130, at block 560, it is determined if the key is a Globally Unique Identifier (GUID-based key). If the key is GUID-based, in one embodiment of the invention, the data migration tool 120 creates at block 570 a unique Key Generator tModel (KGTM) on behalf of the owner of the data item. The KGTM is saved in the destination repository 130 at block 550. An advantage of this embodiment is that the new key gets derived by the original key by appending a column and a predefined alphanumeric string thus making the new key easily reproducible. However, for each migrated key, the data migration tool 120 saves two data items in the destination repository: the KGTM and the migrated UDDI data item itself. In another embodiment of the invention, the UDDI data item may be saved with an empty key thus allowing the destination repository 130 to provide a key. In this embodiment, only one UDDI data item will be saved in the destination repository 130; however, the users will not be able to imply any relationship between the original and the generated keys. In both of these embodiments, the data migration tool 120 saves a mapping between the original key and the generated key to be used by the UDDI clients 210 after the migration is complete in order to access the migrated data items by their original keys.

If at block 560 it is determined that the key is not GUID-based, at block 580, it is determined if the owner of the data item in the destination repository 130 could be the owner of the corresponding KGTM. If it can, the data migration tool 120 determines how many key generators need to be saved in the destination repository 130 so that ultimately the corresponding KGTM is saved on behalf of the UDDI data item owner. The algorithm for this process is derived from the UDDI v3 specification, chapter 5.2.2.1: Key generator keys and their partitions. The UDDI data item is saved at block 550.

If, at block 580, it is determined that the owner of the UDDI data item cannot be the owner of the corresponding KGTM, the UDDI data item is saved with an empty key as discussed above for blocks 530 through 550, thus allowing the destination repository to provide a key.

Figure 6:
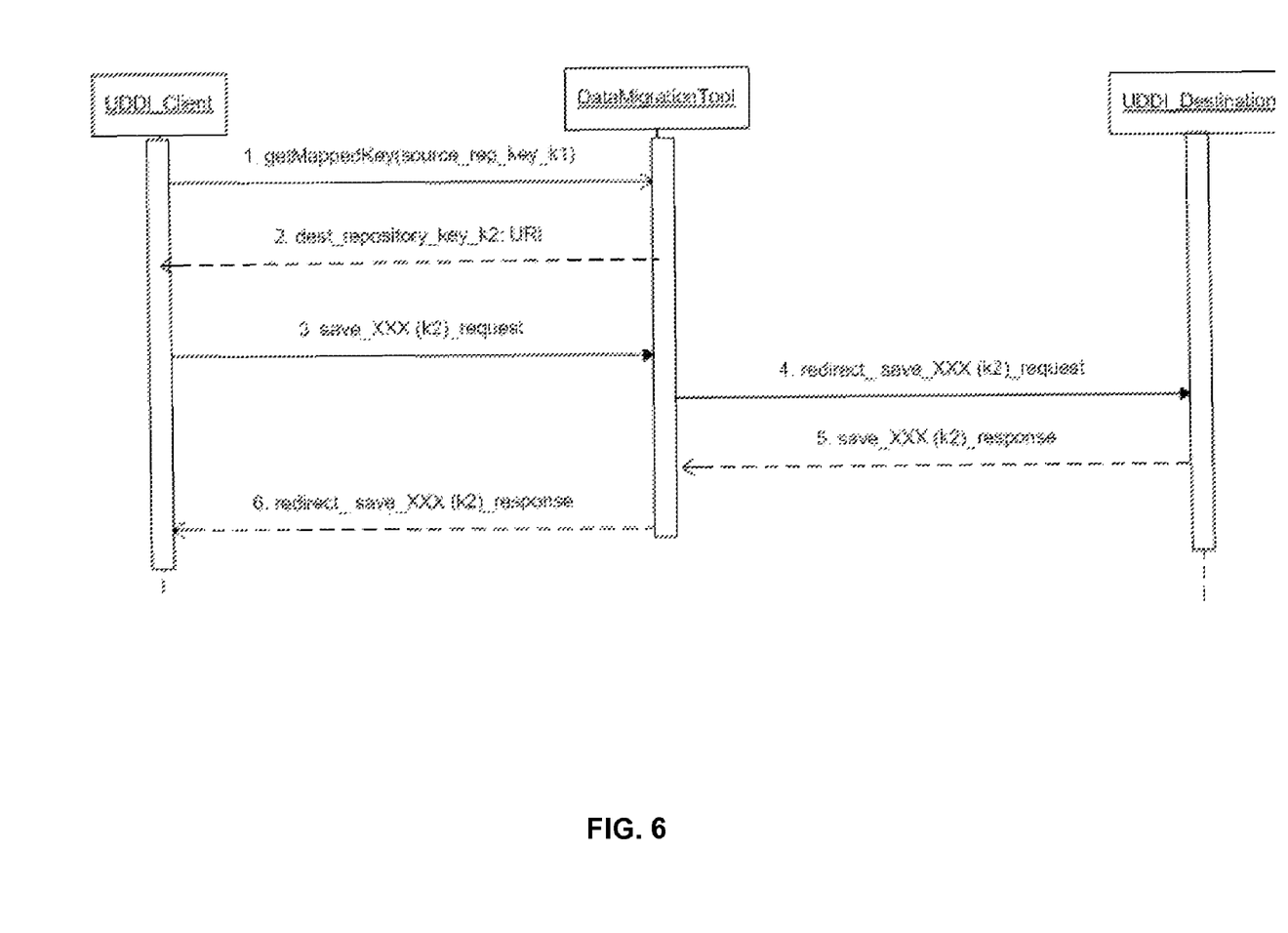
FIG. 6 is a sequence diagram for updating a UDDI data item, migrated in the destination repository with entity key k2, when the original key k1 associated with the UDDI data item in the source repository already exists in the destination repository, in accordance with an embodiment of the present invention.

FIG. 6 is a sequence diagram for updating a UDDI data item, migrated in the destination repository 230 with entity key k2, because its original key k1 associated with the UDDI data item in the source repository 110 already exists in the destination repository 130. The data migration tool 120 provides meta-information about the new UDDI entity key k2 that corresponds to the original key k1 from the source repository 110. In this case, the data migration tool 120 could not determine unambiguously which UDDI data item is meant by a UDDI client when using the key k1—whether the original UDDI data item from the source repository or the still existing data item from the destination repository with the same UDDI entity key. The data migration tool assumes that whenever the entity key k1 is used in a UDDI client request, it always denotes the data item from the destination repository that existed before the data migration process has started (and still exist there under the same UDDI entity key). The data migration tool accepts UDDI client requests to the destination repository, but will not substitute or map in any way the entity key k1. To get the new UDDI entity key k2 in the destination repository of a UDDI data item with key k1 from the source repository, a UDDI client of the destination repository sends the request getMappedKey[k1] to the data migration tool. The data migration tool will return the new entity key k2. A UDDI client of the destination repository will use the UDDI entity key k1 for the already existing UDDI data item in the destination repository before the migration process has started, and the UDDI entity k2 for the entity key k1 that has been migrated from the source repository into the destination.

In an embodiment of the invention, all UDDI clients of the source repository access the destination repository from different endpoints from the endpoints given to the UDDI clients of the destination repository. This way, each UDDI client request that comes from former UDDI clients of source repository will undergo mapping of keys, whereas each UDDI client request that comes from former clients of destination repository will not undergo key mappings processing. This embodiment avoids changes in UDDI clients code, if a UDDI data item from the source repository is migrated into the destination repository with entity key k2, because its original key k1 already exists in the destination repository.

Figure 7:
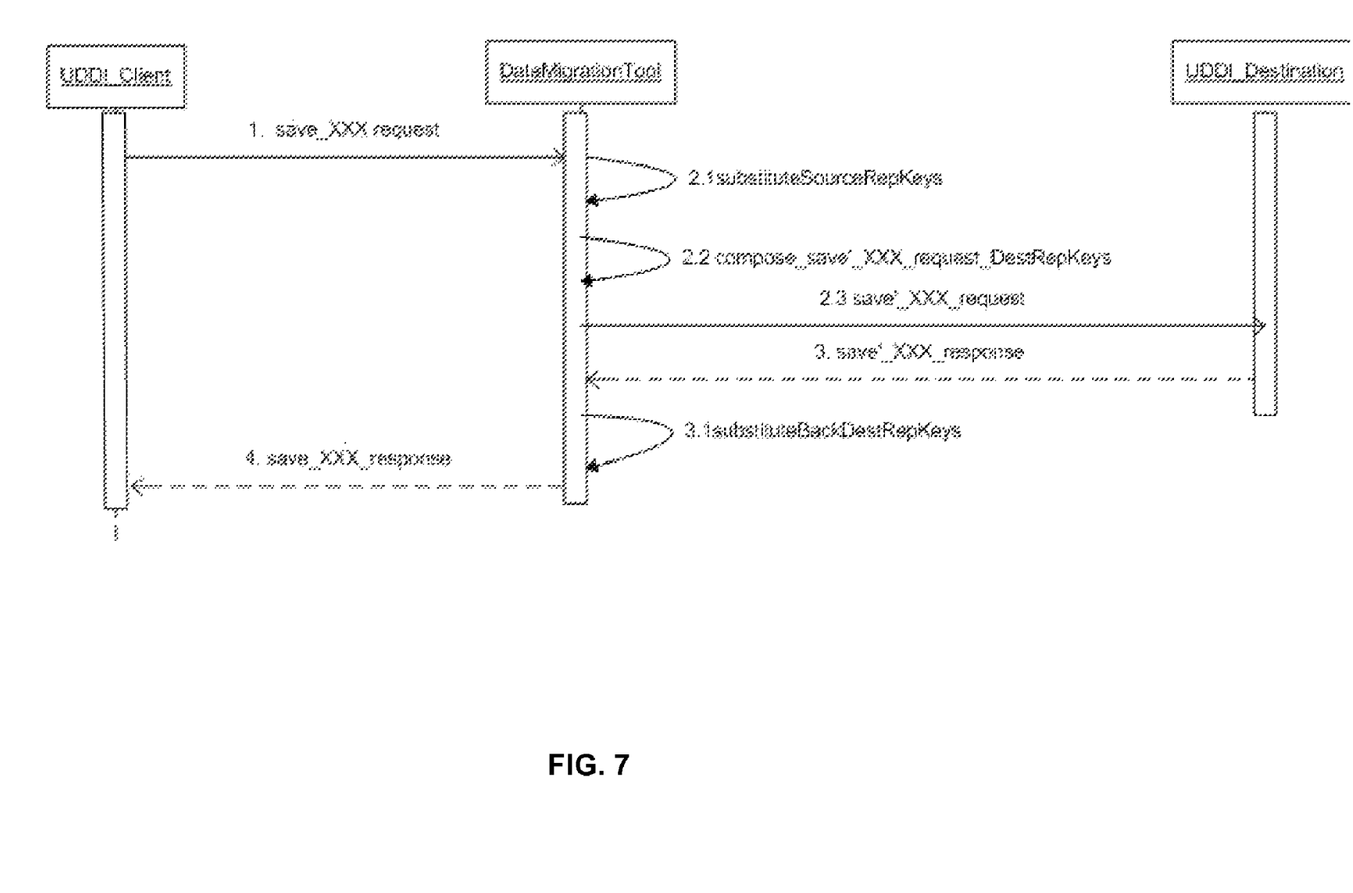
FIG. 7 is a sequence diagram for processing a save request containing the original key associated with the UDDI data item in the source repository, when the original key does not exist in the destination repository, but the UDDI data item is saved with a different key in the destination repository, in accordance with an embodiment of the present invention.

FIG. 7 is a sequence diagram for processing a save request containing the original key associated with the UDDI data item in the source repository by the UDDI data migration tool, where the original key does not exist in the destination repository and the UDDI data item is saved with a different key in the destination repository. The data migration tool benefits from the fact that the original key from the source repository is not found in the destination repository and, therefore, identifies a UDDI data item unambiguously. The data migration tool accepts any UDDI API client request, parses it and substitutes all original UDDI entity keys with their new values in the destination repository. The data migration tool redirects the request to the destination repository, accepts the response from destination repository, parses the response, processes the response by substituting back all destination entity keys with their original values, and finally returns the processed response back to the UDDI client 210.

Figure 8:
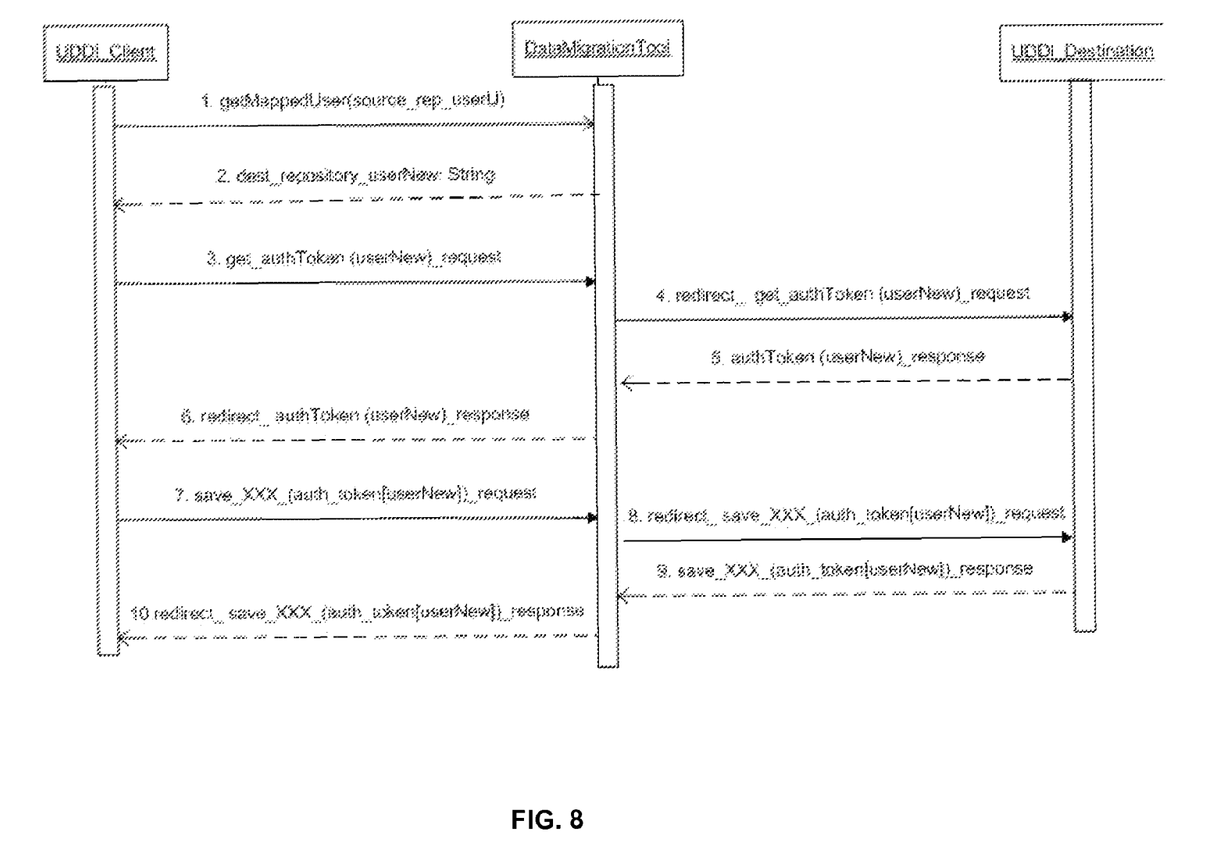
FIG. 8 is a sequence diagram for updating a UDDI data item, migrated in the destination repository on behalf of a user having different user name in the destination repository, in accordance with an embodiment of the present invention.

FIG. 8 is a sequence diagram for updating a UDDI data item where the data item was migrated in the destination repository on behalf of a user having different user name in the destination repository. The data migration tool 220 provides meta-information about the new user name userNew that corresponds to the original user userU from the source repository 110. To understand the new user name of the user userU in the destination repository 230, a UDDI client 210 sends the request getMappedUser[userU] to the data migration tool 220. The data migration tool 220 returns the user name userNew. If a UDDI client 210 inquires (or publishes) into the destination repository 230 with the user name userU, then the destination repository 230 interprets this username as the user userU that existed (and still exists) in the destination repository 230 before the migration process has started.

Figure 9:
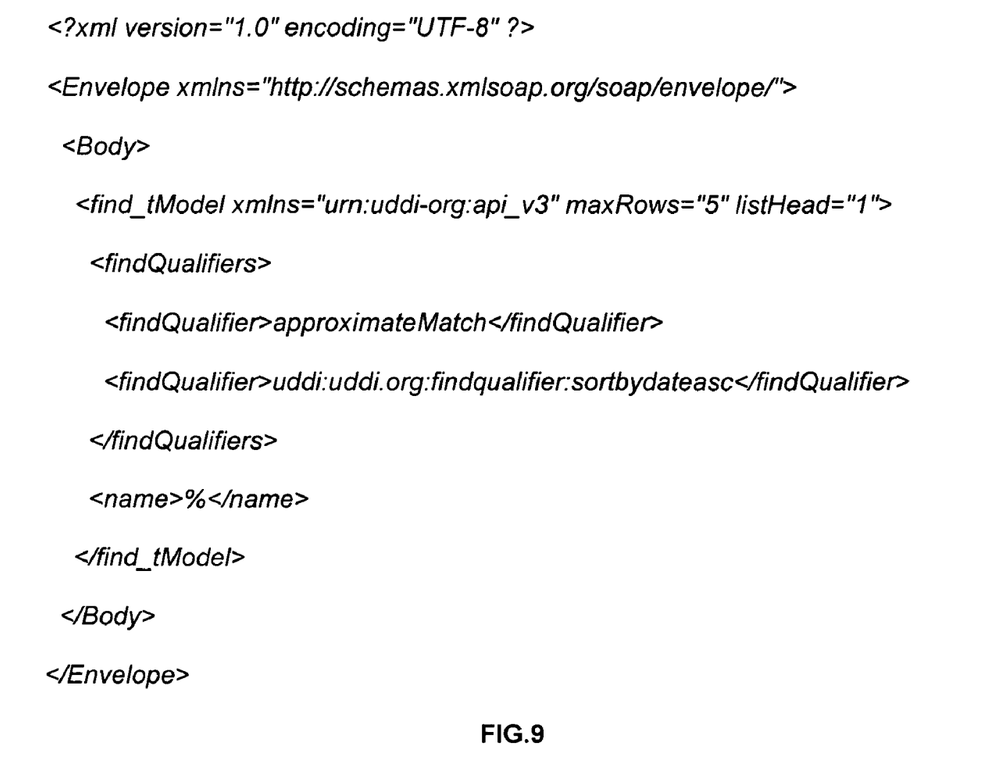
FIG. 9 is an example of a UDDI request, obtaining information about all tModel items from a source repository in the order in which they were saved, in accordance with an embodiment of the present invention.

FIG. 9 is an example of a UDDI request, obtaining information about all tModel items from a source repository in the order in which they were saved. According to UDDI v3 specification, chapter 11.4.13: UDDI Sort By Date Ascending Find Qualifier, the uddi:uddi.org:findqualifier:sortbydateasc find qualifier is used to enable ordering of UDDI inquiry results using the date last updated in each result, in an ascending sequence.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for Universal Description Discovery and Integration (UDDI) data migration comprising:
   extracting data from a UDDI compliant source repository along with a UDDI entity key and a user name associated with the data;
   importing the extracted data into a UDDI compliant destination repository;
   determining if the UDDI entity key and the user name already exists in the destination repository;
   preserving the UDDI entity key in the destination repository during the import of the extracted data into the destination repository if the UDDI entity key does not already exist in the destination repository, else generating a new UDDI entity key to be associated with the imported data if the UDDI entity key already exists in the destination repository, the generating of the new UDDI entity key comprising mapping the UDDI entity key associated with the extracted data to the new UDDI entity key associated with the imported data; and
   preserving the user name in the destination repository during the import of the extracted data into the destination repository, if the user name does not already exist in the destination repository or if the user name exists and designates the same user as the one associated with the extracted data, else generating a new user name to be associated with the imported data, if the user name associated with the extracted data already exists in the destination repository and does not designate the same user as the one associated with the extracted data, the generating the new user name comprising mapping the user name associated with the extracted data to the new user name associated with the imported data.

2. The method of claim 1, wherein the data is extracted from the source repository and imported into the destination repository using standard UDDI SOAP requests.

* * * * *